United States Patent
Kamei et al.

(10) Patent No.: US 8,226,920 B1
(45) Date of Patent: Jul. 24, 2012

(54) APPARATUS AND METHOD FOR PRODUCING POLYCRYSTALLINE SILICON HAVING A REDUCED AMOUNT OF BORON COMPOUNDS BY VENTING THE SYSTEM WITH AN INERT GAS

(75) Inventors: Takeshi Kamei, Theodore, AL (US); Mamoru Nakano, Yokkaichi (JP)

(73) Assignees: Mitsubishi Polycrystalline Silicon America Corporation (MIPSA), Theodore, AL (US); Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 12/986,392

(22) Filed: Jan. 7, 2011

(51) Int. Cl.
*C01B 33/03* (2006.01)
*C01B 33/035* (2006.01)
(52) U.S. Cl. .................. 423/349; 423/342; 423/348
(58) Field of Classification Search .................. None
See application file for complete search history.

(56) References Cited

U.S. PATENT DOCUMENTS

| 4,713,230 | A | 12/1987 | Doornbos |
| 7,632,478 | B2 * | 12/2009 | Poepken et al. ............. 423/348 |
| 2010/0034722 | A1 * | 2/2010 | Ishii et al. .................... 423/342 |

FOREIGN PATENT DOCUMENTS

| JP | 2005-067979 A | | 3/2005 |
| JP | 2008201863 | * | 9/2009 |
| WO | WO2008041261 | * | 4/2008 |

* cited by examiner

*Primary Examiner* — Stanley Silverman
*Assistant Examiner* — Justin Bova
(74) *Attorney, Agent, or Firm* — Edwards Wildman Palmer LLP

(57) ABSTRACT

The invention concern an apparatus and a method for manufacturing polycrystalline silicon having a reduced amount of boron compounds. The invention feeds Ar gas in a trichlorosilane line, which connects a trichlorosilane (TCS) tank and a series of distillation units. The distillation units have a pressure transducer and a pressure independent control valve (PIC-V) positioned on a vent gas line for discharging vent gas from the distillation units. Ar gas is fed to the TCS line with higher pressure than the pressure set for opening the PIC-V. The TCS is distilled by the distillation units with continuously discharging vent gas from the distillation units.

3 Claims, 1 Drawing Sheet

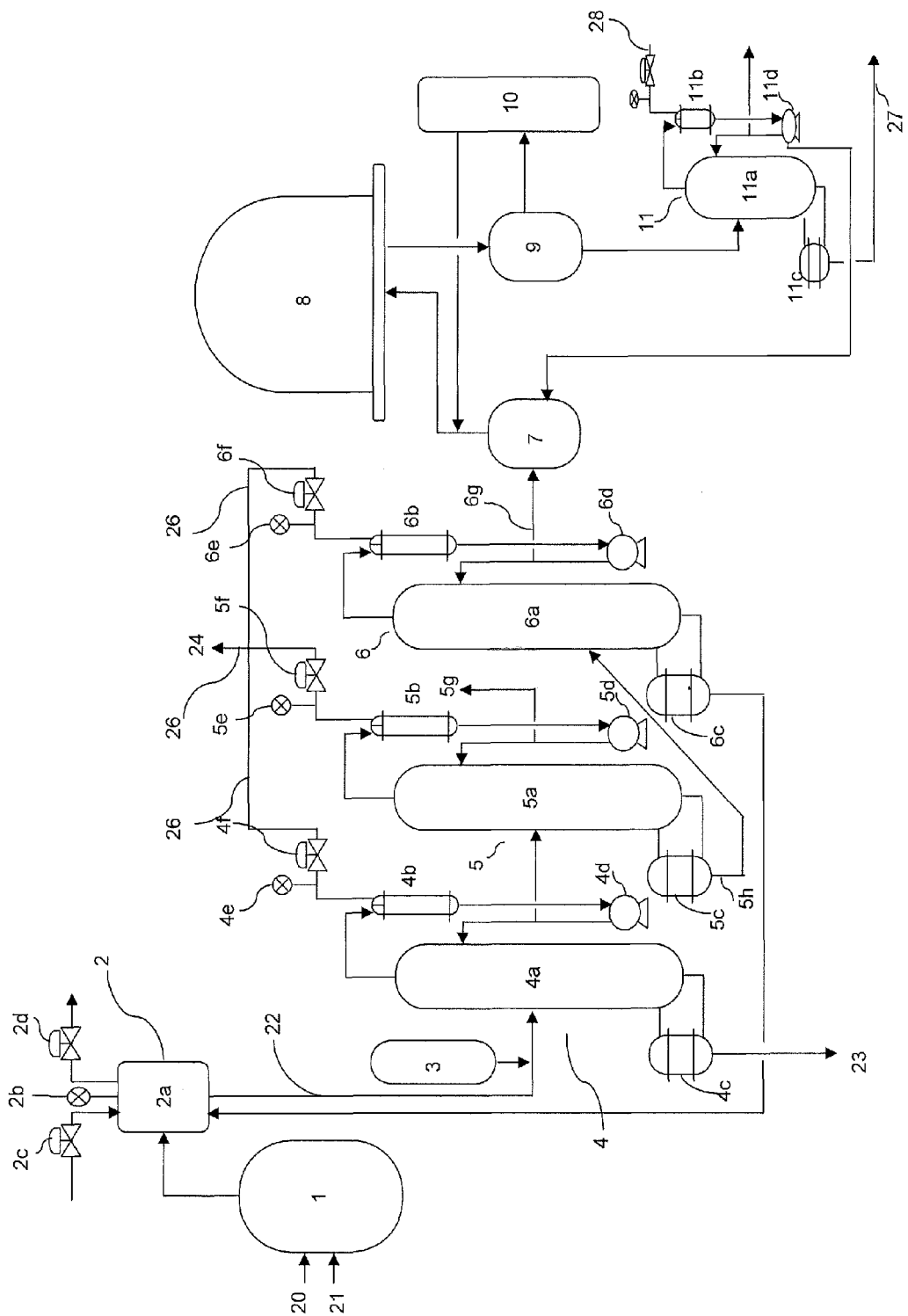

APPARATUS AND METHOD FOR PRODUCING POLYCRYSTALLINE SILICON HAVING A REDUCED AMOUNT OF BORON COMPOUNDS BY VENTING THE SYSTEM WITH AN INERT GAS

BACKGROUND OF THE INVENTION

1. Field of the Invention

The present invention relates to an apparatus and a method for producing polycrystalline silicon having a reduced amount of boron compounds. Especially, the boron compounds are removed from the process for producing polycrystalline silicon, while the trichlorosilane is purified by distillation.

2. Description of Related Art

Polycrystalline silicon is produced by the reaction of trichlorosilane and hydrogen gas, in a process known as the Siemens method. In the Siemens method, high-purity polycrystalline silicon deposits on polycrystalline silicon seed rods by hydrogen reduction of trichlorosilane shown by formula (1) and thermal decomposition of trichlorosilane shown by formula (2):

$$SiHCl_3 + H_2 \rightarrow Si + 3HCl \qquad (1)$$

$$4SiHCl_3 \rightarrow Si + 3SiCl_4 + 2H_2 \qquad (2).$$

Trichlorosilane ($SiHCl_3$, abbreviated "TCS", boiling point: 31.8° C.), used as a raw material for producing high purity polycrystalline silicon, is produced by reacting metallurgical grade silicon powder (abbreviated "Me-Si") of about 98% purity, which includes boron impurities, with hydrogen chloride gas (abbreviated "HCl"). Because other reactants are also produced in the reaction, a distillation process follows the reaction of TCS and HCl.

Trichlorosilane is purified by the distilling process. However, it is very difficult to separate trichlorosilane and boron compounds, produced in the reaction, which have low boiling points like diborane ($B_2H_6$) (boiling point: −92.5° C.), boron trichloride ($BCl_3$) (boiling point: 12.4° C.), tetraborane ($B_4H_{10}$) (boiling point: 18° C.), etc., by commercial distillation processes, because the boiling point of many boron compounds are close to or lower than that of TCS. Boron is included in metallurgical grade silicon powder as an unavoidable impurity. Several different boron compounds are created in the TCS and HCl reaction.

Some methods for producing trichlorosilane are proposed for removing boron compounds, for example as disclosed in Japanese Unexamined Patent Application Publication No. 2005-67979. The application proposes a method in which an ether group is added to an unpurified chlorosilane, then the unpurified chlorosilane is distilled. However, ether group recovery followed by refining is necessary. Further, U.S. Pat. No. 4,713,230 proposes a process for purification of trichlorosilane in which the vapor phase trichlorosilane, contaminated with boron compounds, is passed through a bed of silica. But a fixed bed of silica is required to maintain the cleaning of the silica.

One object of this present invention is to provide an apparatus and a method for manufacturing polycrystalline silicon having a reduced amount of boron compounds.

SUMMARY OF THE INVENTION

This invention relates to an apparatus for producing polycrystalline silicon having a reduced amount of boron compounds, the apparatus has the following components: (A) a fluidized-bed reactor (chlorinator) for reacting metallurgical grade silicon with hydrogen chloride gas for producing TCS; (B) an inert gas feeding unit for feeding an inert gas to a TCS line extending from the fluidized-bed reactor to a distillation unit; (C) the distillation unit for purifying the TCS; (D) a pressure independent control valve located in a vent gas line discharging from the distillation unit; and (E) a reactor for polycrystalline silicon deposition on a surface of silicon seed rods.

This invention also relates to a method for producing polycrystalline silicon having a reduced amount of boron compounds, the method having the following steps: (A) reacting metallurgical grade silicon with hydrogen chloride to produce a reacted gas including TCS, in a fluidized-bed reactor, (B) feeding an inert gas to a TCS line extending from the fluidized-bed reactor to a distillation unit, (C) distilling the TCS for purifying in a process with a continuously discharging vent gas; and (D) depositing polycrystalline silicon on silicon seed rods.

The apparatus of the present invention has a fluidized-bed reactor for reacting metallurgical grade silicon powders having more than 98 wt % purity with hydrogen chloride. Unpurified TCS is produced by the reaction at about 280° C. (536° F.) to about 320° C. (608° F.) in the fluidized-bed reactor. This temperature range is effective for stimulating a reaction between the metallurgical grade silicon powders and the hydrogen chloride gas to uniformly disperse hydrogen chloride gas in the fluidized-bed reactor. The unpurified TCS includes boron compounds, and is fed to a TCS tank after it is condensed.

The TCS tank is provided for collecting the TCS. It is possible to constantly feed the TCS to a distillation process. The TCS tank is connected to the distillation process by a TCS line. The present invention feeds about $1.7 \times 10^{-4}$ $Nm^3$/kg-TCS (or a range of about $1.0 \times 10^{-5}$ $Nm^3$/kg-TCS to about $3.3 \times 10^{-4}$ $Nm^3$/kg-TCS) of inert gas, like He, $N_2$, Ar for example, to the TCS line by an inert gas feeding unit.

The TCS is fed from the TCS tank to the distillation process, which comprises a plurality of distillation units. Each distillation unit has a distillation tower (or column), a condenser, a reboiler and a pump. Typically, a continuous fractional distillation is used as a distillation tower. Next, in the first distilling process, a distillation temperature at a top of a first distillation column is set between about a boiling point of trichlorosilane and about a boiling point of silicon tetrachloride, so that trichlorosilane is vaporized and separated as a vapor fraction. More specifically, the temperature at the top of the first distillation column, at 96 kPa (gauge pressure), is set between about 46° C. (115° F.) and about 56° C. (133° F.). Boron compounds having a high boiling point, silicon tetrachloride ($SiCl_4$, abbreviated "STC", boiling point: 57.6° C.), polymer and a small amount of TCS as "bottoms", are separated in the distillation process. The vapor distillates, or vapor fractions, from the process include boron compounds having a low boiling point or low boiling temperature, TCS, and a small amount of dichlorosilane (abbreviated "DCS", boiling point: 8.4° C.).

The vapor fraction is fed to a condenser and is condensed to liquid. The condenser has a vent gas line; and a pressure transducer and a pressure independent control valve (hereinafter called "PIC-V") are located in the vent gas line. The pressure transducer detects a pressure inside of the condenser. When the pressure inside of the condenser exceeds a predetermined pressure, the PIC-V is opened so that the pressure inside of the condenser is maintained around a constant pressure. In the present invention, an inert gas is fed to the TCS line so that the PIC-V is continuously open. Low boiling point boron compounds, such as diborane ($B_2H_6$), boron trichloride ($BCl_3$), tetraborane ($B_4H_{10}$), remain in a gaseous state in the condenser and are discharged out of the process through the vent gas line. The condensed TCS is refluxed to the distillation tower by a pump. A part of the condensed TCS is fed to another or the next distillation tower and distillation is repeated in the next distillation unit.

Residue fractions are fed from a bottom of the distillation tower to a reboiler. The residue fractions are heated and a stream of the residue fractions is fed back to the distillation tower. Liquid of the residue fractions which include high boiling point boron compounds, such as pentaborane ($B_5H_9$), pentaborane ($B_5H_{11}$), diboron tetrachloride ($B_2Cl_4$), hexaborane ($B_6H_{10}$), and decaborane ($B_{10}H_{14}$), is discharged from the reboiler.

After that, in the second distilling process, a distillation temperature at a top of a distillation column is set between about a boiling point of dichlorosilane and about the boiling point of trichlorosilane. Preferably, the temperature at a top of a second distillation column is set between about 50° C. (122° F.) and about 60° C. (140° F.), at 125 kPa (gauge pressure). Pure trichlorosilane is separated from the first vapor fractions by distillation. Boron compounds having a low boiling point, DCS and a little TCS are separated as second vapor distillates.

The process is repeated in additional distillation columns. The TCS is purified by the above-mentioned distillation process. The purified TCS is fed to a reactor for depositing polycrystalline silicon on polycrystalline silicon seed rods.

This invention provides an apparatus and a method, which removes boron compounds from the TCS in the distillation process, and which produces polycrystalline silicon having a reduced amount of boron.

BRIEF DESCRIPTION OF THE DRAWING

The single FIGURE (FIG) is a process flow diagram illustrating an embodiment of the invention.

DETAILED DESCRIPTION OF THE INVENTION

The FIG. shows a process flow of this invention. This invention comprises a fluidized-bed reactor 1, a TCS tank unit 2, an inert gas feeding unit 3, distillation units 4-6, a vaporizer 7, a reactor 8, a condenser 9, a hydrogen recovery process 10 and a distillation unit 11 for the condensate of the condenser 9.

The fluidized-bed reactor 1 is for reacting metallurgical grade silicon powder (Me-Si) 20 of about 98% purity with hydrogen chloride (HCl) gas 21, based on reaction formula (3):

$$\text{Me-Si} + 3\text{HCl} \rightarrow \text{SiHCl}_3 + H_2 \quad (3).$$

As a result of the Me-Si and HCl reaction, a reaction gas is produced in the fluidized-bed reactor 1. The reaction gas includes TCS, STC, DCS and boron compounds. The typical yield of reactants after chlorination process in the fluidized-bed reactor is approximately the following: TCS at 88 wt %, STC at 11.5 wt %, DCS at 0.5 wt % and boron at 3,000 to 6,000 ppbwt. More specifically, TCS is included at more than 80 wt %. In this embodiment, a fluidized-bed type reactor is used. The metallurgical grade silicon powder 20 is continuously fed to the fluidized-bed reactor 1. The hydrogen chloride gas 21 is fed to the fluidized-bed reactor 1 and is reacted with the metallurgical grade silicon powder 20 while the hydrogen chloride gas 21 passes through the metallurgical grade silicon powder 20. A bed temperature of the fluidized-bed reactor 1 is set between about 280° C. and about 320° C. This range of temperature is selected for producing TCS effectively. Temperatures especially over 320° C. (608° F.) are not favorable for creating a ratio of TCS. The reacted gas and unreacted gas are discharged from the fluidized-bed reactor 1.

The reacted gas with the unreacted gas is fed to a chiller (not shown) for making a condensate including TCS. Unreacted hydrogen chloride gas and hydrogen gas are removed from this process as vent gases. The condensate including TCS is fed to the TCS tank 2. A purpose of the TCS tank 2 is to feed TCS to the distillation process constantly at a flow rate between about $1.2 \times 10^{-3}$ m³/s to about $2.0 \times 10^{-3}$ m³/s in this embodiment. An atmosphere in the TCS tank 2 is changed by an inert gas, like He, $N_2$, Ar gas, etc. and is maintained at a uniform pressure by a pressure independent control valve 2c and a pressure independent control valve 2d, which are connected with a pressure transducer 2b. The TCS tank 2 is connected to a distillation unit 4 by a TCS line 22.

The inert gas, like He, $N_2$, Ar gas, feeding unit 3 is located on the TCS line 22 and the inert gas feeding unit 3 feeds inert gas at a flow rate of about $1.7 \times 10^{-4}$ Nm³/kg-TCS or a range of flow rates of about $1.0 \times 10^{-5}$ Nm³/kg-TCS to about $3.3 \times 10^{-4}$ Nm³/kg-TCS. The flow rate is chosen to make an after-mentioned pressure independent control valve 4f-6f open continuously, so that the inert gas, as well as low boiling point boron, is continuously purged. Inert gas does not react with TCS or other chlorosilanes and is not a obstacle for producing polycrystalline silicon.

Each distillation unit 4-6 has a distillation tower 4a-6a, a condenser 4b-6b, a pump 4d-6d, and a reboiler 4c-6c. A continuous and fractional type distillation is used as distillation tower 4a-6a. A distillation temperature at a top of the distillation tower 4a-6a is set between about the boiling point of TCS and about the boiling point of tetrachlorosilane, so that TCS is vaporized and separated as a vapor fraction. More specifically, the temperature at the top of the first distillation column, at 80 kPa (gauge pressure), is set between about 45° C. (113° F.) and about 55° C. (131° F.). The temperature at the top of the distillation tower is controlled by a ratio of reflux of vapor fraction and a temperature of the reboiler.

The vapor fraction is fed to the condenser 4b-6b and is condensed to liquid in the condenser 4b-6b. The condenser has a vent gas line 26, and a pressure transducer 4e-6e and the PIC-V 4f-6f are located on the vent gas line 26. The pressure transducers 4e-6e measure a pressure inside of the condenser. A pressure of the condenser is maintained uniformly by the PIC-V 4f-6f based on actual measurements by the pressure transducers 4e-6e. The PIC-V 4f-6f are set to open a valve at pressures over 4f: 96 kPaG, 5f: 125 kPaG and 6f: 96 kPaG respectively, for example. When the pressure inside of the condenser exceeds a preset pressure, the PIC-V is opened so that the pressure inside of the condenser is maintained at a constant pressure. Vent gases 24 are discharged from the condenser 4b-6b out of the process. Typically vent gases 24 are continuously discharged. These vent gases include inert gas and various low boiling point boron compounds, such as diborane ($B_2H_6$), boron trichloride ($BCl_3$), tetraborane ($B_4H_{10}$). Therefore, the low boiling point boron compounds are discharged with the inert gas from the distillation unit. The PIC-V are kept open, because the pressure inside of the condenser 4b-6b and distillation tower 4a-6a is increased by adding the inert gas in the TCS line 22. The condensed TCS is refluxed to the distillation tower by the pump 4d-6d. A part of the condensed TCS can fed to a next distillation tower and distillation is repeated depending on the number of distillation columns. Ultimately, a purified and condensed TCS is fed to the vaporizer 7 via line 6g.

In the embodiment in the FIG., part of the condensed TCS from condenser 5b is not sent to the next distillation tower 6a, but is instead cut and separated via line 5g. Instead, the bottoms of reboiler 5c is removed and sent to the next distillation column 6a via line 5h.

In the case of the other distillation columns, residue fractions are removed from a bottom of the distillation tower 4a to the reboiler 4c. The residue fractions in distillation tower 4a are heated between about 77° C. (170° F.) to about 91° C. (195° F.) at 80 kPaG to 96 kPaG. Liquid of the residue fractions, which include a high boiling point boron compounds, such as pentaborane ($B_5H_9$), pentaborane ($B_5H_{11}$), diboron tetrachloride ($B_2Cl_4$), hexaborane ($B_6H_{10}$), and decaborane ($B_{10}H_{14}$), is discharged from the reboiler 4c as bottoms 23. A stream of the residue fractions of the reboiler 6c is fed back to the distillation tower 4a via the TCS tank 2a. In the distillation process, low boiling point boron compounds such as diborane ($B_2H_6$), boron trichloride ($BCl_3$), tetraborane ($B_4H_{10}$) are also removed from the distillation tower 5a to the vent gas stream 26 and to the reflux cut stream 5g. Typical purified TCS is preferred to include no more than 0.030 ppbwt of boron compound.

In the embodiment shown in the FIG., without an inert gas feed, in other words inert gas at a flow rate of $0 \times 10^{-4}$ $Nm^3$/kg-TCS, the following conditions given in Table 1 are example conditions in the distillation columns:

TABLE 1

| Distillation Column Condition | Distillation Column Number | | |
|---|---|---|---|
| | 4a | 5a | 6a |
| Temperature at top of column (° C.) | 50 | 56 | 46 |
| Temperature at bottom of column (° C.) | 78 | 66 | 58 |
| Pressure PIC-V valve (kPaG) set to open | 96 | 125 | 96 |
| Column Pressure (kPaG) | 80 | 123 | 54 |

With these conditions, the purified TCS sent to the vaporizer 7 is about 0.015 ppbwt of boron compound.

In the vaporizer 7, the purified TCS is vaporized and the TCS gas and purified hydrogen are fed to the reactor 8 for producing polycrystalline silicon. A molar ratio of the purified TCS and the purified hydrogen gas is about 1:8, for example.

A plurality of silicon seed rods (not shown) stand in the reactor 8. The plurality of silicon seed rods are heated by resistance between about 1,000° C. (1,832° F.) to about 1,200° C. (2,192° F.). High-purity polycrystalline silicon deposits on the polycrystalline silicon seed rods by hydrogen reduction of TCS and thermal decomposition of TCS. Unreacted TCS gas, unreacted hydrogen gas and other generated chlorosilane gases are discharged from the reactor 8 and are fed to the condenser 9. The mixture of unreacted TCS gas and generated STC gas is condensed in the condenser 9 and is fed to distillation unit 11 for the separation of TCS and STC. The distillation unit 11 has a distillation tower 11a, a condenser 11b, a reboiler 11c and a pump 11d. Compounds remaining in a gaseous state in the condenser 11b are discharged out of the process through the vent gas line 28. Some of the condensed TCS is refluxed to the distillation tower 11a by the pump 11d and some of the separated TCS is fed back to the vaporizer 7 for recycle. Finally, some of the bottoms from reboiler 11c, particularly STC, is cut and discharged from the process via discharge line 27.

The unreacted hydrogen and other chlorosilanes stay in the gaseous state in the condenser 9 and are fed to a hydrogen recovery process 10 for purifying hydrogen gas. Pressure swing adsorption is applied to the hydrogen recovery process 10. Purified hydrogen gas is fed back to the reactor 8.

The FIG. is also a process flow diagram illustrating the same system except with an inert gas feed, in this case Ar gas feed. In this embodiment, Ar gas feed from the gas inert gas feeding unit 3 is about $1.7 \times 10^{-4}$ $Nm^3$/kg-TCS of inert gas, to the TCS line 22.

In the embodiment, with Ar gas feed, the following conditions given in Table 2 are example conditions in the distillation columns:

TABLE 2

| Distillation Column Condition | Distillation Column Number | | |
|---|---|---|---|
| | 4a | 5a | 6a |
| Temperature at top of column (° C.) | 52 | 56 | 52 |
| Temperature at bottom of column (° C.) | 81 | 66 | 63 |
| Pressure PIC-V valve (kPaG) set to open | 96 | 125 | 96 |
| Column Pressure (kPaG) | 96 | 125 | 96 |

With these conditions under Ar gas feed, the purified TCS sent to the vaporizer 7 is about 0.005 ppbwt of boron compound.

In this invention, the distillation process comprise three distillation units 4-6. However, the number of distillation units is not limited, it is acceptable to modify the number of the distillation unit and type of distillation to the extent of the invention.

The invention and embodiment are described for illustrative, but not limitative purposes. It is to be understood that changes and/or modifications can be made by those skilled in the art without for this departing from the related scope of protection, as defined by the enclosed claims.

What is claimed is:

1. A method for manufacturing polycrystalline silicon having a reduced amount of boron compounds, comprising:
   reacting metallurgical grade silicon with hydrogen chloride to produce a reacted gas, including trichlorosilane, in a fluidized-bed reactor;
   feeding an inert gas from an inert gas feeding unit to a line extending from the fluidized-bed reactor to a distillation unit, the line containing the reacted gas including trichlorosilane;
   distilling the trichlorosilane while continuously discharging a vent gas from the distillation unit; and
   reducing the resulting distilled trichlorosilane with hydrogen to produce polycrystalline silicon and depositing the polycrystalline silicon on silicon seed rods.

2. The method for manufacturing polycrystalline silicon having a reduced amount of boron compounds according to claim 1, wherein the inert gas is Ar gas.

3. The method for manufacturing polycrystalline silicon having a reduced amount of boron compounds according to claim 1, wherein trichlorosilane after distillation is purified to less than about 0.030 ppbwt of boron compound.

* * * * *